United States Patent
Pasumarthi et al.

(10) Patent No.: US 9,667,740 B2
(45) Date of Patent: May 30, 2017

(54) SYSTEM AND METHOD OF FORMATTING DATA

(71) Applicant: SAP AG, Walldorf (DE)

(72) Inventors: Suresh Pasumarthi, Bangalore (IN); Anil Babu Ankisettipalli, Bangalore (IN)

(73) Assignee: SAP SE, Walldorf (DE)

( * ) Notice: Subject to any disclaimer, the term of this patent is extended or adjusted under 35 U.S.C. 154(b) by 723 days.

(21) Appl. No.: 13/750,618

(22) Filed: Jan. 25, 2013

(65) Prior Publication Data

US 2014/0215093 A1    Jul. 31, 2014

(51) Int. Cl.
H04L 29/08    (2006.01)

(52) U.S. Cl.
CPC ............ H04L 67/306 (2013.01); H04L 67/26 (2013.01)

(58) Field of Classification Search
CPC .......... H04L 1/00; H04L 67/26; H04L 67/306
USPC ........................................ 709/246, 247, 226
See application file for complete search history.

(56) References Cited

U.S. PATENT DOCUMENTS

| | | | |
|---|---|---|---|
| 5,566,289 A | 10/1996 | Ikeo et al. | |
| 6,336,124 B1 | 1/2002 | Alam et al. | |
| 6,397,232 B1 | 5/2002 | Cheng-Hung et al. | |
| 7,262,772 B2 | 8/2007 | Ebert | |
| 7,565,605 B2 | 7/2009 | Schohn et al. | |
| 7,702,680 B2 | 4/2010 | Yih et al. | |
| 7,797,626 B2 | 9/2010 | Rosenpflanzer et al. | |
| 8,127,237 B2 | 2/2012 | Beringer | |
| 8,661,338 B2 | 2/2014 | Purvis et al. | |
| 2004/0133848 A1* | 7/2004 | Hunt et al. | 715/500 |
| 2005/0097458 A1 | 5/2005 | Wilson | |
| 2007/0266330 A1 | 11/2007 | Friedland et al. | |
| 2008/0139112 A1 | 6/2008 | Sampath et al. | |
| 2008/0160956 A1* | 7/2008 | Jackson et al. | 455/406 |
| 2009/0172161 A1* | 7/2009 | Singh | 709/225 |
| 2011/0057790 A1* | 3/2011 | Martin et al. | 340/539.13 |
| 2011/0173346 A1 | 7/2011 | Neben | |
| 2013/0205202 A1 | 8/2013 | Xiao et al. | |
| 2014/0215093 A1 | 7/2014 | Pasumarthi et al. | |

FOREIGN PATENT DOCUMENTS

WO    2013101169 A1    7/2013

\* cited by examiner

*Primary Examiner* — Nicholas Taylor
*Assistant Examiner* — Afroza Sultana
(74) *Attorney, Agent, or Firm* — Fountainhead Law Group P.C.

(57) ABSTRACT

A system and method of formatting data. The system accounts for the user's current device and current activity in order to determine the appropriate format for presenting data.

27 Claims, 4 Drawing Sheets

SYSTEM AND METHOD OF FORMATTING DATA

CROSS REFERENCE TO RELATED APPLICATIONS

Not applicable.

BACKGROUND

Technical Field

The present disclosure relates to data processing, and in particular, to presenting information to users.

Description of the Related Art

Unless otherwise indicated herein, the approaches described in this section are not prior art to the claims in this application and are not admitted to be prior art by inclusion in this section.

Today almost all professionals carry at a minimum 2-3 computing devices (mobile telephone, personal digital assistant, media player, tablet computer, laptop computer, etc.). Much of a person's waking hours are spent using one or more of these devices. With better bandwidth availability and a company's policies of bring your own device (BYOD), the options for consuming information are increasing.

Most of time, the same information is presented to users in all devices with optimization on rendering. As an example, consider a report block that is to be displayed on a mobile telephone, a tablet computer, and a laptop computer; the same data and representation of data is enabled to suit the landscape and interactivity of the devices. The report designer is aware of these possible output device parameters and designs the report block accordingly.

Sometimes it is more appropriate for the information to be represented in different formats for analysis on different devices. For example, when the user is using a device with a large display (desktop computer, laptop computer, etc.), it is appropriate to present an entire document; when the user is using a mobile device (e.g., for telephone calls, chatting, etc.), it is appropriate to present alerts or summaries of the document. Each of these stages requires different information representation and media for communicating.

SUMMARY

In today's world, the report designer has to manually morph the same content to make it suitable to different personas and devices. In the end, it does not matter on the quantity but what matters is the quality of relevant information in a format that is intuitive and in the context of the scenario. There is a need to improve the efficiency of the report designer given these challenges.

One embodiment is a computer-implemented method of formatting data. The method includes determining, by a computer system, that data is to be sent to a user. The method further includes determining, by the computer system, a current user activity, a current user persona and a current user device that are associated with the user. The method further includes determining a format for the data according to the current user activity, the current user persona and the current user device. The method further includes sending the data in the format to the current user device.

The method may further include determining a user preference related to the current user activity, the current user persona and the current user device, where the format is determined according to the user preference, the current user activity, the current user persona, and the current user device.

The method may further include storing a plurality of user preferences and selecting a selected user preference from the plurality of user preferences based on the current user activity, the current user persona and the current user device, where the format is determined according to the selected user preference, the current user activity, the current user persona, and the current user device.

A computer system may operate to implement the method described above. The computer system may store, execute or be otherwise controlled by one or more computer programs that control the computer system to implement the method described above. The computer system may implement an analytics services component, an intelligence content engine component, a publisher component, a user preference component, and a storage component in order to perform the functionality of the method.

A non-transitory computer readable medium may store instructions to control a computer system to perform the method described above. The instructions may include an analytics services component, an intelligence content engine component, a publisher component, a user preference component, and a storage component.

In this manner, the system accounts for the user's current device and current activity in order to determine the appropriate format for presenting data.

The following detailed description and accompanying drawings provide a better understanding of the nature and advantages of the present disclosure.

DETAILED DESCRIPTION

Figure 1:
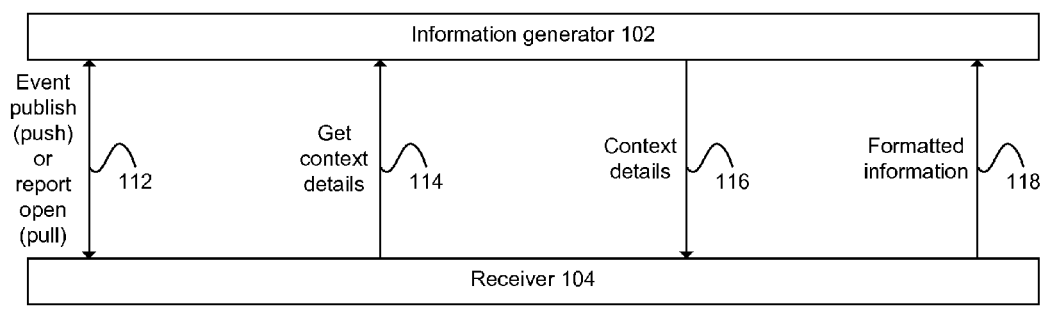
FIG. 1 is a block diagram that shows the sequence of operations between an intelligent information generator (e.g., a mobile telephone) and a receiver (e.g., the intelligence content engine application).

Described herein are techniques for formatting data. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

The systems and methods detailed herein make the content more relevant to the users at that particular time specially when the data being pushed for the different subscriptions the user has made to different services and applications. The techniques are also applicable when a particular device is performing a pull as requested by the user from any application or service on the device. So, it is a goal to push/pull the information in an appropriate format to the proper device.

The systems and methods detailed herein implement a technique to automatically to push the information in an appropriate format to the device/equipment based on the current activity. This solution may integrate with existing solutions of capturing user activity that may be monitored as the user is producing the desktop activity, internet activity and messaging activity. This document focuses on the format of the content rather than how to capture activity of the user. However, all these activities play an important factor in achieving our goal of the most appropriate format.

The systems and methods detailed here implement an intelligence content engine (ICE) which presents qualitative information in an appropriate format rather than quantitative information in a way that would seduce the users. As a result, the user's curiosity is aroused yet not overwhelmed. The user is then able to obtain further information based on how, when and what information was pushed in the context of user and device.

The information from various sources is pulled by the service. Example sources include calendar information (e.g., pulled from Microsoft Outlook™), event information (e.g., pulled from <meetup.com>), or check-in information (e.g., pulled from <foursquare.com>). The user's past activities for different time periods may be stored and accessed by the service, to be used directly or in case information for the corresponding current time is not available. However, the latest updated activity available may be given preference when compared to the default values or past activity information.

The following are example activities that the service may pick up from the above-mentioned different sources and configurations:

Meeting—Sourced from calendars (e.g, Microsoft Outlook™), etc.

Sleeping—Time zone, time, and mode of the device (ringer off, etc.).

Travelling—Global positioning system (GPS) or geolocation coordinates.

Presentation—Use of slideshow program (e.g., Microsoft PowerPoint™, projector connectivity, etc.).

Reading—Active state documents.

Browsing—Active state of browsers.

Chatting—Desktop tools (e.g., Google Gchat™, etc.).

Vacation—GPS or geolocation coordinates.

(In general, travelling is similar to vacation in that the user is outside their normal office location, but differs in that for travelling the user will generally want to see a full set of mobile alerts, whereas for vacation the user will generally want to see only high importance alerts or subscriptions.) The intelligence service will consider from all the possible formats of data, the role of the user to whom content has to be pushed, and location, along with the activities mentioned above to decide the format of information to be pushed to the device of the user.

FIG. 1 is a block diagram that shows the sequence of operations between an intelligent information generator 102 (e.g., a mobile telephone) and a receiver 104 (e.g., the ICE application). The information generator 102 may include a client agent that interacts with the receiver 104 regarding the activity monitoring information. The receiver 104 may be implemented by an application server.

Line 112 indicates that the device information may be pushed from the information generator 102 to the receiver 104, or may be pulled by the receiver 104 from the information generator 102. Line 114 indicates that the receiver 104 requests the context information (e.g., the activity information) from the information generator 102. Line 116 indicates that the information generator 102 sends the context information to the receiver 104. Line 118 indicates that the formatted information is transmitted from the receiver 104 to the information generator 102.

The client agent in the information generator 102 is capable of responding with the user current activity, for example by using user activity monitoring software. This information is used by ICE when there is a request for information publishing. The information can be published in various ways. If user has requested a scheduled pull of data (like refresh a document) or when there are events configured on the enterprise server with one of the destinations is email or SMS or any other mobile format, then enterprise server will push the information. Before pushing the information, the ICE will get the activity and preferences from the client and format accordingly.

Figure 2:
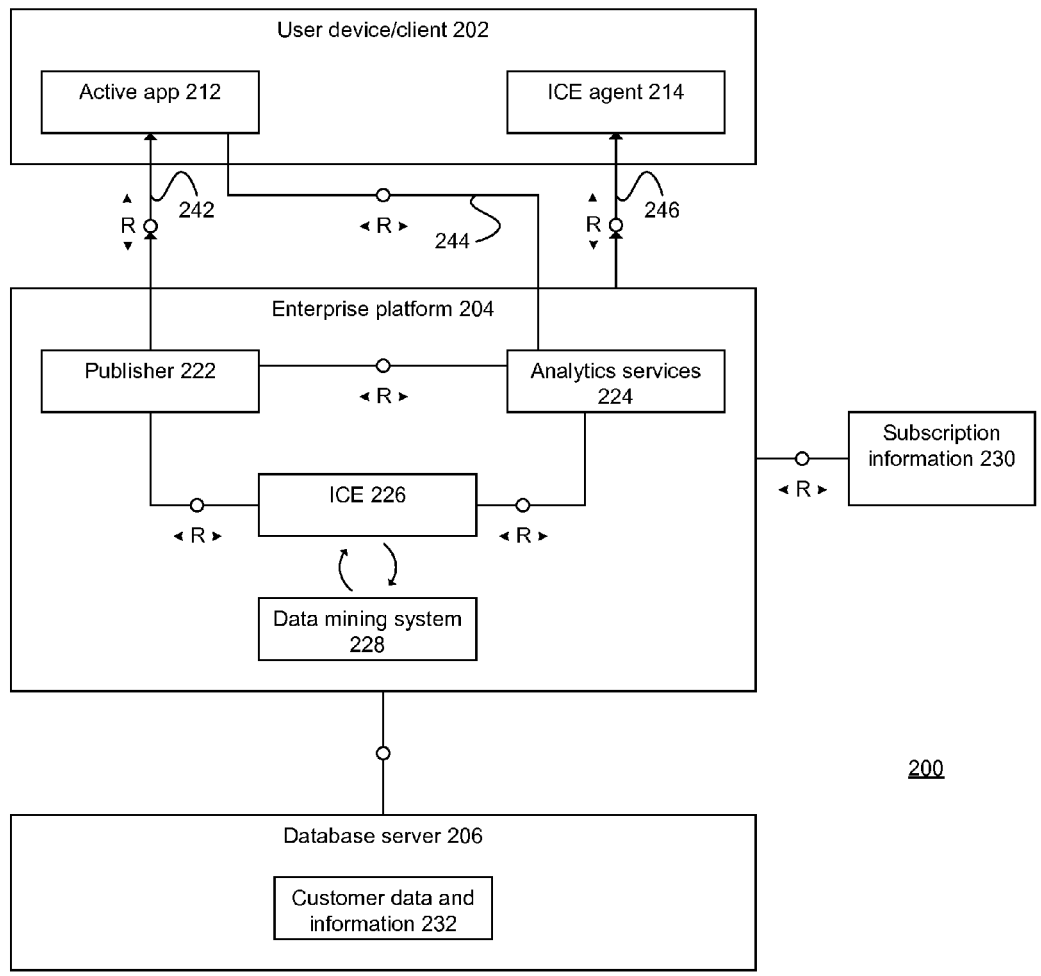
FIG. 2 is a block diagram showing more details of the intelligence content engine system according to an embodiment.

FIG. 2 is a block diagram showing more details of the ICE system 200 according to an embodiment. The ICE system 200 may be implemented using a three-tier architecture that includes a presentation tier—a user device (or user client on a device) 202; an application tier—an enterprise platform 204 implemented by an application server; and a database tier—a database server 206.

The user device 202 executes a number of applications, including an active application 212. These applications include client-side programs such as a word processor, a web browser, an email program, a calendar program, etc. that correspond to the current user activity. The user device 202 also executes an ICE agent 214. The ICE agent 214 monitors the current user activity and reports to the enterprise platform 204.

The enterprise platform 204 generally implements an environment for executing server-side business programs, for example in the areas of enterprise resource planning, supply chain management, inventory management, accounting, forecasting, collaboration, word processing, email, calendaring, etc. Specifically regarding the ICE system, the enterprise platform 204 executes a number of applications, including a publisher 222, analytics services 224, the ICE application 226 itself, and a data mining system 228. The publisher 222 provides subscribed content 242 to the active application 212. For example, when the active application 212 corresponds to the user viewing the user's calendar, the publisher 222 corresponds to the calendar application implemented on the enterprise platform 204, and the subscribed content 242 corresponds to the user's calendar information. The analytics service 224 interacts with the active application 212 to receive activity information 244 that corresponds to the user's current activity. The ICE application 226 generally implements the ICE system as discussed throughout this document; the ICE application 226 may be implemented as a service executed by the enterprise platform 204. The data mining system 228 generally implements data mining algorithms that mine the user's historical activity logs, for use by the ICE application 226 in determining the appropriate format for data presentation to the user. For example, the user's historical activities across the devices are stored for different time periods along with time zone and geo location. The data mining system 228 implements a machine learning algorithm to decide the format of the content to be pushed to the user and his/her device based on the learnings from the past, when user activity for a particular time is not available from the data published to the ICE application 226. For example, the data mining system 228 uses the enterprise data that is defined during subscription (e.g., the subscription information 230) and provided by the ICE application 226. The data mining system 228 executes various machine learning techniques, such as classification, using algorithms based on neural networks or decision trees. The enterprise platform 204 also sends the active state information 246 to the ICE agent 214. The active state information 246 includes information that indicates the current state of the user, such as asleep, on vacation, browsing the internet, in a text chat, in a video conference, giving a presentation with an attached projector, etc.

The enterprise platform 204 also accesses the subscription information 230 when performing its functions. The subscription information 230 may be stored in a metadata repository that the enterprise platform may use to store the metadata related to performing other of its functions. The subscription information 230 generally includes the user's settings and preferences, such as event settings, device settings, general preferences, push destination settings, etc. The event settings correspond to actions to take in response to other events. For example, the user can configure an alert to occur when a purchase order needs approval; the ICE system then uses the current user activity, etc. in order to determine the appropriate user device and to format and send the alert. The device settings correspond to the devices associated with the user. The general preferences correspond to user preferences that may be used to override or supplement the format determination. For example, the user may configure the preferences to format and send the information to the user's desktop computer when the user is travelling on a specific day, instead of using the default that sends the information to the user's mobile device. The push destination settings allow the user to define devices which are to be pushed information.

The database server 206 generally implements a database system that interacts with the enterprise platform. The database server generally implements a database that stores the customer data and information 232, for example as business objects.

The ICE system 200 generally operates as follows. The user subscribes each of his devices into the metadata repository. It contains information such as International Mobile Equipment Identification (IMEI) codes or generated tokens so that push services can communicate the events. The enterprise platform 204 maintains the user role and hierarchy.

When event content is to be published (e.g., there are events in reports or events in the database), the system first acquires the active state of the user on all his subscribed devices. This information or state is used by Intelligence Content Engine (ICE) 226 to generate the content; the publisher 222 makes sure that it reaches the appropriate destinations (e.g., to an application on a device, as an alert on the system). The ICE agent 214 calculates the current active state of the user on the device 202. If the user is using a desktop computer as the device 202 to log in to the enterprise platform 204, the alert may be sent via email. When the information is pulled by the user via refresh (or other ways, such as via a client application running on the device 202), system follows the same flow as described above regarding subscribed information and alerts.

The ICE 226 generally operates as follows. When data is to be presented to the user, the ICE 226 examines the data, determines the kind of data, and determines the presentation format in which the data is to be pushed. More specifically, the ICE 226 identifies the possible formats that can be published, checks the persona (e.g., user role) to whom the data is to be sent, identifies the user's current location and current activity, checks the user's preference settings based on the above persona and activities, and then sends the data in the appropriate format to the device 202 based on the preference settings.

Data Formats

The data may be formatted in various ways, including an unstructured data format, a structured data format, and a media format.

The unstructured data format may also be referred to as "big text" and may be presented as the textual data itself or as a text summary of the textual data. The textual data that may be summarized may be from product reviews, social media (comments about a brand or service provisioning, etc.), published content (government policy reports, natural disaster reports, environmental conditions, etc.), email (e.g., discussions regarding a particular topic or subject), forums (queries, comments and discussions regarding a brand or service provisioning), etc.

The structured data format generally includes tables, charts and graphs generated from the underlying data. The structured data may also include plain text. The structured data format may also include maps or geographical charts when the underlying data contains geographic information. The structured data format may also include enriched plain text, for example insights in the form of sentences enriched by performing data mining. Various forms of data mining may be performed, such as by applying statistics such as above or below an average or mean, with aggregation across different dimensions. The statistics may be presented in the form of percentages or in pure numerical forms. If a dimension value it repeated, the system may apply a cluster grouping algorithm. If the data has a time dimension, the system may apply a time series forecasting algorithm. If the data set is large, the system may apply an outlier algorithm, an exception algorithm, or an anomaly algorithm to highlight noteworthy data elements. TABLE 1 lists various types of data requests and algorithm selections.

TABLE 1

| Data | Algorithm |
| --- | --- |
| Given demographic data about a set of customers, predict customer response to an affinity card program. | Classification |
| Given demographic data about a set of customers, identify customer purchasing behavior that is significantly different from the norm. | Anomaly Detection |
| Given demographic and purchasing data about a set of customers, predict customer's age. | Regression |
| Given customer response to an affinity card program, find the importance of independent attributes. | Attribute Importance |
| Segment demographic data into 10 clusters and study the individual clusters. Rank the clusters on probability. | Clustering |
| Find the association between items bought by customers. | Association Rules |

The media data format generally includes audio data. For example, the system converts the most relevant insight generated from unstructured or structured data from text to speech in order to present the data in audio format.

Persona Details

The persona generally refers to the user's role. The persona options may include operational users, casual users, power users, and chief-level users (high-level users such as chief executive officer, chief financial officer, chief operating officer, etc., also referred to as "C users"). For temporary or part time users, the default format is auditory format of aggregated or summarized information. For power users or business analysts, the default format is to show detailed information in the form of tables, reports and interactive charts. For operational users, the default format is a summary or recommendation in context without providing full details. For casual users, the default format is tables, charts and graphs. For C users, the default format is summarized text format in the form of sentences or audio format, and aggregated charts. The format may be modified from the default according to the user preferences and current user activity as discussed above.

Additional Details

Regarding the current activity, the ICE 226 checks with the client 202 to obtain the user's current activity, current location, and current mobility status.

Regarding the user preferences, the user may modify these in the subscription information 230. The user may set the preferences according to the activity and the time of day.

Regarding formats, the ICE 226 may determine the default format according to the activity, device and persona as set forth in TABLE 2. This default format may then be modified according to the user's preferences.

TABLE 2

| Activity | Device | Persona | Format |
| --- | --- | --- | --- |
| Meeting | Mobile Tablet | Any | Plain text |
|  | Laptop | C user | Plain text with summarized reports |
|  |  | Business analyst | Detailed reports |
|  |  | Operational user | Recommendations in the form of summaries |

TABLE 2-continued

| Activity | Device | Persona | Format |
| --- | --- | --- | --- |
| Browsing | Mobile Tablet | Any | Plain text |
|  |  | C user | Plain text with summarized reports |
|  |  | Business analyst | Detailed reports |
|  |  | Operational user | Recommendations in the form of summaries |
|  | Laptop | C user | Plain text with summarized reports |
|  |  | Business analyst | Detailed reports |
|  |  | Operational user | Recommendations in the form of summaries |
| Chatting | Mobile or Tablet | Any | Plain text or summary |
|  |  | C user | Plain text with summarized reports |
|  | Laptop | Business analyst | Detailed reports |
|  |  | Operational user | Recommendations in the form of summaries |
| Vacation | Any | Any | Audio or summarized text |
| Sleeping | Any | Any | Summarized text |
| Travelling | Any | Any | Audio or summarized text |
| Presentation | Any | Any | Summarized plain text |
| Reading | Mobile | C user | Summarized plain text |
|  |  | Business analyst |  |
|  |  | Operational user | Recommendations in the form of summaries |
|  | Tablet | C user | Summarized plain text with link to aggregate report |
|  |  | Business analyst | Detailed report |
|  |  | Operational user | Recommendations in the form of summaries |
|  | Laptop | C user | Summarized plain text with link to aggregate report |
|  |  | Business analyst | Detailed report |
|  |  | Operational user | Recommendations in the form of summaries |

Finally, if the publisher 222 detects a low bandwidth connection to the user device 202, the ICE 226 may select a lower bandwidth format than would otherwise be selected. For example, if audio format is appropriate in a normal bandwidth situation, then the ICE 226 may select a text summary format in a low bandwidth situation.

Figure 3:
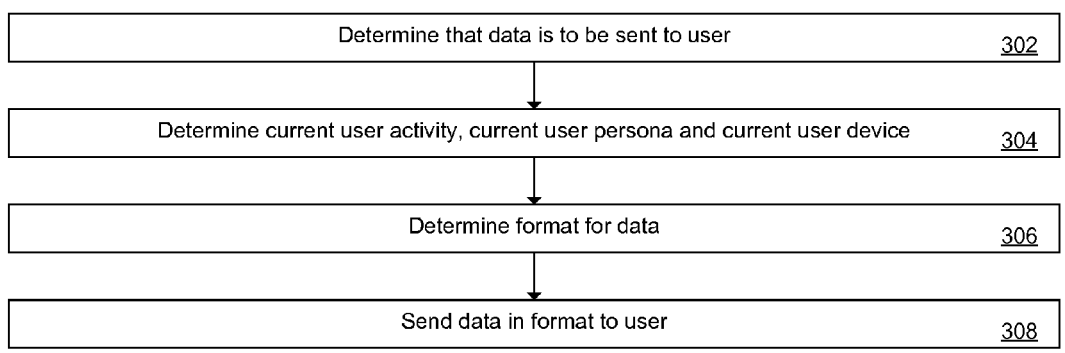
FIG. 3 is a flowchart of a process of formatting data.

FIG. 3 is a flowchart of a process 300 of formatting data. The process 300 may be implemented by the ICE system 200 (see FIG. 2), more specifically by the ICE 226 and other components of the enterprise platform 204, for example as controlled by one or more computer programs.

At 302, the computer system determines that data is to be sent to a user. Such determination may follow as a consequence of performing scheduled push operations (according to the subscription information 230), or upon receiving a pull request from the user device 202. The analytics services component 224 may implement this step.

At 304, the computer system determines a current user activity, a current user persona and a current user device that are associated with the user. The current user activity, persona and device may be as discussed above and as set forth in TABLE 2. The analytics services component 224 may implement this step.

At 306, a format for the data is determined according to the current user activity, the current user persona and the current user device. For example, the ICE 226 may use the information set forth in TABLE 2 for the activity, persona and device in order to determine the format.

At 308, the data in the format is sent to the current user device. For example, the publisher 222 sends the data in plain text format to the user device 202.

Figure 4:
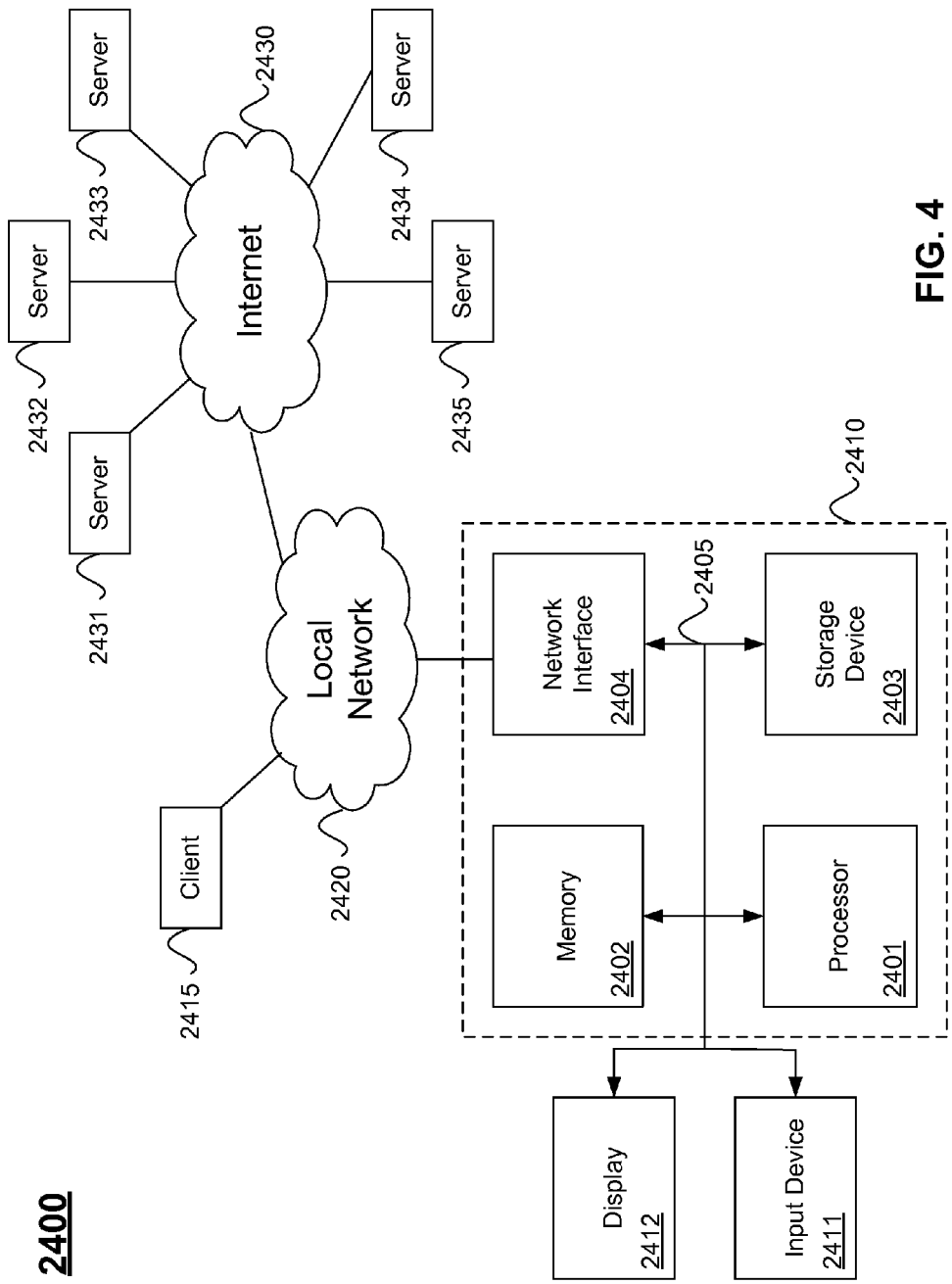
FIG. 4 is a block diagram of an example computer system and network for implementing embodiments of the present disclosure.

FIG. 4 is a block diagram of an example computer system and network 2400 for implementing embodiments of the present disclosure. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM) (when not storing temporary variables or other intermediate information), or both. A storage device 2403 is also provided for storing information and instructions. Common forms of storage devices include, for example, a hard drive, a magnetic disk, an optical disk, a CD-ROM, a DVD, a flash memory, a USB memory card, a solid state drive, or any other medium from which a computer can read. Storage device 2403 may store source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, as described above, the server 2431 may store the customer data and information 232 (see FIG. 2), e.g., in one or more database tables. The server 2410 may implement the enterprise platform 204 or components thereof, such as the ICE 226. The client 2415 may implement a user interface client for a user to interact with the server 2410, for example to implement the user device 202.

The above description illustrates various embodiments along with examples of how aspects of the present invention may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method of formatting data, comprising:
    storing, by a computer system, a plurality of user activities, a plurality of user personas, a plurality of user devices, and a plurality of formats, wherein each of the plurality of formats corresponds to a combination of one of the plurality of user activities, one of the plurality of user personas, and one of the plurality of user devices;
    determining, by the computer system, that data is to be sent to a user;
    determining, by the computer system, a current user activity, a current user persona and a current user device that are associated with the user;
    determining a format from the plurality of formats for the data according to the current user activity, the current user persona and the current user device;
    detecting, by the computer system, a low bandwidth connection to the current user device;
    selecting, by the computer system, a lower bandwidth format than the format; and
    sending the data in the lower bandwidth format instead of in the format to the current user device.

2. The computer-implemented method of claim 1, further comprising:
    determining a user preference related to the current user activity, the current user persona and the current user device,
    wherein the format is determined according to the user preference, the current user activity, the current user persona, and the current user device.

3. The computer-implemented method of claim 1, further comprising:
    storing a plurality of user preferences; and
    selecting a selected user preference from the plurality of user preferences based on the current user activity, the current user persona and the current user device,
    wherein the format is determined according to the selected user preference, the current user activity, the current user persona, and the current user device.

4. The computer-implemented method of claim 1, wherein the format is one of an unstructured data format, a structured data format, and a converted-to-voice format.

5. The computer-implemented method of claim 1, wherein the current user activity is one of a meeting activity, a presentation activity, and a chatting activity.

6. The computer-implemented method of claim 1, wherein the current user activity is one of a browsing activity and a reading activity.

7. The computer-implemented method of claim 1, wherein the current user activity is one of a vacation activity, a sleeping activity, and a travelling activity.

8. The computer-implemented method of claim 1, wherein the current user persona is one of a temporary user, a casual user, an operation user, and a power user.

9. The computer-implemented method of claim 1, wherein the current user device is one of a mobile device, a tablet device, and a laptop device.

10. A system for formatting data, comprising:
a memory that is configured to store a computer program; and
a processor that is configured to execute the computer program, the computer program controlling the system to execute processing, including:
controlling the system to store a plurality of user activities, a plurality of user personas, a plurality of user devices, and a plurality of formats, wherein each of the plurality of formats corresponds to a combination of one of the plurality of user activities, one of the plurality of user personas, and one of the plurality of user devices;
controlling the system to determine, that data is to be sent to a user, and to determine a current user activity, a current user persona and a current user device that are associated with the user;
controlling the system to determine a format from the plurality of formats for the data according to the current user activity, the current user persona and the current user device;
controlling the system to detect a low bandwidth connection to the current user device;
controlling the system to select a lower bandwidth format than the format and
controlling the system to send the data in the lower bandwidth format instead of in the format to the current user device.

11. The system of claim 10, wherein the computer program controls the system to execute processing further comprising:
controlling the system to determine a user preference related to the current user activity, the current user persona and the current user device,
wherein the format is determined according to the user preference, the current user activity, the current user persona, and the current user device.

12. The system of claim 10, wherein the computer program controls the system to execute processing further comprising:
controlling the system to store a plurality of user preferences; and
controlling the system to select a selected user preference from the plurality of user preferences based on the current user activity, the current user persona and the current user device,
wherein the format is determined according to the selected user preference, the current user activity, the current user persona, and the current user device.

13. The system of claim 10, wherein the format is one of an unstructured data format, a structured data format, and a converted-to-voice format.

14. The system of claim 10, wherein the current user activity is one of a meeting activity, a presentation activity, and a chatting activity.

15. The system of claim 10, wherein the current user activity is one of a browsing activity and a reading activity.

16. The system of claim 10, wherein the current user activity is one of a vacation activity, a sleeping activity, and a travelling activity.

17. The system of claim 10, wherein the current user persona is one of a temporary user, a casual user, an operation user, and a power user.

18. The system of claim 10, wherein the current user device is one of a mobile device, a tablet device, and a laptop device.

19. A non-transitory computer readable medium storing instructions to control a computer system for formatting data, the instructions controlling the computer system to execute processing comprising:
controlling the computer system to store a plurality of user activities, a plurality of user personas, a plurality of user devices, and a plurality of formats, wherein each of the plurality of formats corresponds to a combination of one of the plurality of user activities, one of the plurality of user personas, and one of the plurality of user devices;
controlling the computer system to determine, that data is to be sent to a user, and controlling the computer system to determine a current user activity, a current user persona and a current user device that are associated with the user;
controlling the computer system to determine a format for the data according to the current user activity, the current user persona and the current user device;
controlling the computer system to detecting a low bandwidth connection to the current user device;
controlling the computer system to select a lower bandwidth format than the format and
controlling the computer system to send the data in the lower bandwidth format instead of in the format to the current user device.

20. The non-transitory computer readable medium of claim 19, wherein the instructions control the computer system to execute processing further comprising:
controlling the computer system to determine a user preference related to the current user activity, the current user persona and the current user device,
wherein the format is determined according to the user preference, the current user activity, the current user persona, and the current user device.

21. The non-transitory computer readable medium of claim 19, wherein the instructions control the computer system to execute processing further comprising:
controlling the computer system to store a plurality of user preferences; and
controlling the computer system to select a selected user preference from the plurality of user preferences based on the current user activity, the current user persona and the current user device,
wherein the format is determined according to the selected user preference, the current user activity, the current user persona, and the current user device.

22. The non-transitory computer readable medium of claim 19, wherein the format is one of an unstructured data format, a structured data format, and a converted-to-voice format.

23. The non-transitory computer readable medium of claim 19, wherein the current user activity is one of a meeting activity, a presentation activity, and a chatting activity.

24. The non-transitory computer readable medium of claim 19, wherein the current user activity is one of a browsing activity and a reading activity.

25. The non-transitory computer readable medium of claim 19, wherein the current user activity is one of a vacation activity, a sleeping activity, and a travelling activity.

26. The non-transitory computer readable medium of claim 19, wherein the current user activity is one of a browsing activity and a reading activity.

27. The non-transitory computer readable medium of claim 19, wherein the current user device is one of a mobile device, a tablet device, and a laptop device.

* * * * *